United States Patent

Chi

[11] 4,317,148
[45] Feb. 23, 1982

[54] TRANSDUCER FOR PERPENDICULAR MAGNETIC RECORDING

[75] Inventor: Chao S. Chi, Worcester, Mass.
[73] Assignee: Sperry Corporation, New York, N.Y.
[21] Appl. No.: 114,915
[22] Filed: Jan. 24, 1980
[51] Int. Cl.³ .......................... G11B 5/25; G11B 5/30; G11B 5/22
[52] U.S. Cl. .................................. 360/119; 360/113; 360/125
[58] Field of Search ............... 360/119, 125, 113, 123, 360/121

[56] References Cited

U.S. PATENT DOCUMENTS

| | | | |
|---|---|---|---|
| 2,585,932 | 2/1952 | Hare | 360/119 |
| 3,371,164 | 2/1968 | Makimura | 360/119 |
| 4,138,702 | 2/1979 | Magnenet | 360/125 |
| 4,222,084 | 9/1980 | Nakagawa et al. | 360/119 |

Primary Examiner—Robert S. Tupper
Attorney, Agent, or Firm—Howard P. Terry; Albert B. Cooper

[57] ABSTRACT

The transducer for perpendicular magnetic recording comprises a core of high permeability material having a recording pole and a flux return pole spaced apart and connected by an intermediate member forming an inverted generally U-shaped core. The cross sectional area of the flux return pole is substantially greater than that of the recording pole. Current applied to a coil wound around the recording pole generates flux for recording on the magnetic medium. A similarly shaped second core may be disposed on the opposite side of the medium with respect to the first core for providing a flux return path for the first core. A sub-core of high permeability material mounted on the flux return pole forms a gap with the recording pole to provide a ring-type head for data recovery. Current applied to a coil wound on the sub-core saturates the sub-core to render it ineffective during perpendicular magnetic writing. During reading the sub-core winding is de-energized, transforming the perpendicular magnetic recording head into a ring-type reading head. An alternative reading embodiment utilizes magneto-resistive elements disposed between the recording pole and the flux return pole.

33 Claims, 9 Drawing Figures

TRANSDUCER FOR PERPENDICULAR MAGNETIC RECORDING

BACKGROUND OF THE INVENTION

1. Field of the Invention

The invention relates to digital magnetic read/write transducers particularly with respect to perpendicular magnetic recording on a moving magnetic medium.

2. Description of the Prior Art

Digital magnetic storage systems are in use in which a recording and reading head adjacent a moving magnetic medium magnetizes small areas on the medium for recording digital data and senses the magnetized areas for reading the data. To date the only commercially practicable type of system has been the longitudinal magnetic recording arrangement. Longitudinal magnetic recording utilizes a ring-type head comprising a ring shaped core of high permeability material with a narrow gap therein disposed above or below the moving magnetic medium with the gap length disposed parallel to the direction of travel of the medium. A current pulse applied to a coil wound on the core generates flux lines within the core that are completed along a path comprising one edge of the gap, the magnetic medium adjacent the gap and the other edge of the gap. The flux polarity so threading the medium effects the recording of data. To read the data when the magnetized area on the medium passes adjacent the gap, a flux path through the core is established, thereby threading the coil with flux lines generating a signal indicative of the recorded information.

Such longitudinal magnetic recording systems suffer from the disadvantage of the limited linear bit density that is supportable by the medium. This basic limitation occurs because the magnetized domains in the medium are longitudinally oriented with respect to the medium. This mode exhibits a maximum demagnetizing field at the bit boundary thus limiting the number of transitions that can be recorded in each lineal inch along the recording track. Present practical longitudinal magnetic recording systems also suffer from the disadvantage that the recording and reading gap in the transducer is of a dimension that is a compromise between the reading and writing requirements. Generally a wide gap is desired for writing whereas a narrow gap is desired for reading. The compromised dimension of the gap utilized for both reading and writing results in a degradation in performance with respect to what optimally would be possible in each of the reading and writing modes of the system.

In order to attain a substantial higher lineal bit density than that provided by longitudinal magnetic recording, perpendicular mode magnetic recording may be utilized. In perpendicular magnetic recording, magnetic flux is directed perpendicularly through the medium rather than longitudinally along the medium, as in longitudinal magnetic recording, to effect magnetic domains oriented perpendicular to the surface of the medium. This mode exhibits a minimum demagnetizing field at the bit boundary and thus a larger number of perpendicularly oriented transitions can be packed into each lineal inch of the medium as compared to that of longitudinal magnetic recording systems.

It is appreciated, therefore, that perpendicular magnetic recording offers the potential of greater lineal packing density than does longitudinal magnetic recording. Longitudinal magnetic recording is, however, in wide spread commercial usage whereas perpendicular magnetic recording is, to date, merely a laboratory curiosity. It is believed that perpendicular magnetic recording has not as yet been rendered commercially practicable because of the lack of a suitable read/write transducer compatible with present day magnetic storage interface arrangements. Heretofore an isolated recording pole disposed perpendicular to the medium and a similar pole collinearly disposed beneath the medium with respect to the first pole have provided the perpendicular magnetic recording flux through the medium so as to effect the desired perpendicular orientation of the magnetic domains. The flux return path for such an arrangement is either through the air and/or through the drive spindle and medium substrate of the system. Such arrangements are exceedingly inefficient magnetically and only provide the write function. A separate read head would then be required. Such arrangements are incompatible with present day multiple head, multiple track mass storage systems utilizing one head for both READ and WRITE, rendering the use thereof commercially impracticable.

SUMMARY OF THE INVENTION

The above disadvantages of the prior art are overcome by the present transducer for perpendicular magnetic recording which comprises a core of high permeability material having a recording pole and a flux return pole spaced apart with respect to each other, the flux return pole having a substantially greater cross sectional area than the recording pole. The recording pole and flux return pole are connected to each other by high permeability material to form a flux path therebetween. In use the recording pole and flux return pole are disposed adjacent the moving medium and generally perpendicular thereto. A member of high permeability material disposed on the opposite side of the medium provides a flux return path from the recording pole to the flux return pole. Current applied to a coil wound on the core generates closed loop flux threading the core and member on the opposite side of the medium from the core, thereby applying flux lines perpendicularly through the medium so as to write data on the medium via perpendicularly oriented domains.

A sub-core of high permeability material is affixed to the main core to form a gap with the recording pole for data recovery of the perpendicularly disposed domains. The sub-core with the main core form a ring type head to sense the flux polarity change emanated from the perpendicularly magnetized medium. Current applied to a coil wound on the sub-core saturates the sub-core to render it ineffective during perpendicular magnetic writing. Preferably the flux return member on the opposite side of the medium comprises a core complementary to the first core.

Another embodiment of the invention utilizes magnetoresistive elements disposed between the recording pole and flux return pole for reading the data recorded on the medium.

Further embodiments contemplate a recording pole vertically adjustable with respect to the core so as to minimize the spacing between the recording pole and the medium.

BRIEF DESCRIPTION OF THE DRAWINGS

FIG. 1b is a bottom view of the transducer of FIG. 1a;

FIG. 2b is a bottom view of the transducer of FIG. 2a;

DESCRIPTION OF THE PREFERRED EMBODIMENTS

Figure 1A:
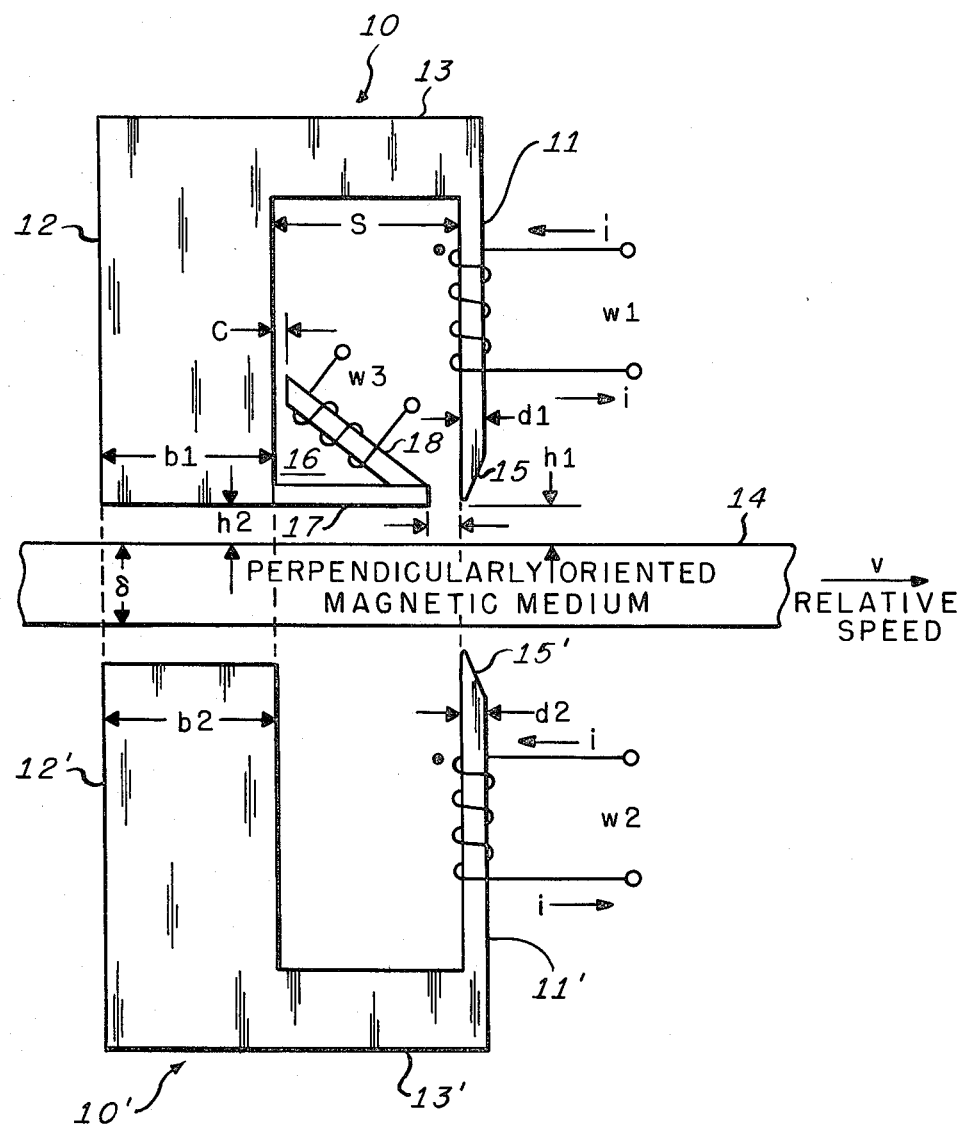
FIG. 1a is a front elevation view of a preferred embodiment of the perpendicular magnetic read/write transducer of the present invention.
Figure 1B:
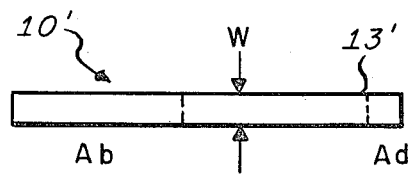

Referring to FIGS. 1a and 1b, a front elevation view and a bottom view respectively of the perpendicular magnetic read/write transducer of the present invention is illustrated. A core 10 of high permeability material such a mu-metal or ferrite is comprised of a recording pole 11 and a flux return pole 12. The recording pole 11 and the flux return pole 12 are spaced apart by a dimension S and are connected to each other by an intermediate core member 13. The recording pole 11 has a width d1 and the flux return pole 12 has a width of b1 and, as appreciated from FIG. 1b, the core 10 has a width of w. Thus as indicated by the legends in FIG. 1b, the recording pole 11 has a cross sectional area of $A_d$ and the flux return pole 12 has a cross sectional area of $A_b$. For reasons to be explained, the cross sectional area $A_b$ should be substantially larger than the cross sectional area $A_d$. Thus with a core of width w, dimension b1 should be substantially greater than dimension d1. The cross sectional areas $A_b$ and $A_d$ can be of any convenient shape, such as rectangular or circular, to facilitate fabrication. In applications where plural heads are stacked side by side, such as in disc files, the dimension w should be narrow to provide narrow recording tracks, thus enhancing track width areal density. In use, the core 10 is disposed at a height $h_1$ above a moving magnetic medium 14. (It is noted that $h_1$ is less than or equal to $h_2$ in practical embodiments). The dimension $h_1$ can also be zero in contact recording. The medium 14 can, for example, be the magnetic surface of a disc in a disc storage system.

A core 10' complementary to the core 10 is disposed below the medium 14 and vertically aligned with the core 10. The core 10' has a recording pole 11' and a flux return pole 12' of similar dimensions to those of the poles 11 and 12, respectively, of the core 10. Preferably the cores 10 and 10' should be identical in shape and dimension and of the same material. The material of the cores 10 and 10' should possess high permeability with a high saturation flux density $B_S$. With the medium 14 moving at a velocity V as indicated by the legend, the poles 12 and 12' are the leading poles of the respective cores 10 and 10' and the poles 11 and 11' are the trailing poles of the respective cores 10 and 10' with respect to the direction of motion of the medium 14. The recording poles 11 and 11' have respective recording tips 15 and 15' which effect the actual recording on the medium 14. The tips 15 and 15' should be very small but with a smooth tip contour so as to produce a well confined and intensified magnetic field strength for recording.

A coil w1 is wound around the recording pole 11 and a coil w2 is wound around the recording pole 11'. The coils w1 and w2 may be wound with the polarities indicated by the dots so as to induce opposite magnetic poles at the recording tips 15 and 15'. For example, with currents flowing through the coils w1 and w2 as indicated by the legends, a south magnetic pole is induced at the recording tip 15 and a north magnetic pole is induced at the recording tip 15'. With currents directed oppositely to those indicated by the legends, the opposite magnetic polarities will be induced at the recording tips 15 and 15'. It is appreciated that other winding arrangements may be utilized to the same effect.

Except for the opposite winding polarity, the coils w1 and w2 are identical with respect to each other. In the WRITE mode of operation, the coils w1 and w2 may be serially connected with respect to each other with the lower end of w1 connected to the upper end of w2. Alternatively, separate matched drivers may be utilized for the respective coils.

Data encoded current applied to the windings w1 and w2 generates closed path flux lines enclosed along the pole 11, the member 13, the flux return pole 12, the air gap-medium-air gap with large cross sectional area, the pole 12', the member 13', the pole 11' and the air gap-medium-air gap region between the tips 15' and 15 where the actual recording is executed, and then back to the pole 11. Thus it is appreciated that by appropriate polarity current switching, perpendicular magnetization transitions are formed in the medium 14 for the recording of data.

For a given magneto motive force generated by the coils w1 and w2, the flux threading the poles 11 and 11' is the same as the flux threading the poles 12 and 12'. Because of the flux confining geometry of the tips 15 and 15' the flux is concentrated and intensified to provide a high flux density or high field intensity (H) at the recording poles. Since the cross sectional area of the flux return poles 12 and 12' is significantly greater than that of the recording poles 11 and 11', the flux density or field strengh through the flux return poles 12 and 12' is significantly less than that through the recording poles 11 and 11'. Thus the low density flux lines traversing the medium 14 at the flux return poles 12 and 12' has a negligible influence on the medium 14 and the data recorded therein. Because of the geometry described, the magnetization disturbance on the medium 14 from the flux return path is minimized. The influence of the flux return path on the recorded data is further minimized since the data written at the trailing, recording poles 11 and 11' are written on an area of the medium 14 that had previously passed between the leading flux return path poles 12 and 12'. Thus the flux return via the significantly larger faces of the poles 12 and 12' with low field intensity prior to the information recording, has a negligible influence on the subsequently recorded data at the poles 11 and 11'.

The dimension S between the recording pole 11 and the flux return pole 12 should be sufficient to prevent leakage flux crossover therebetween in the WRITE mode.

In order to read the recorded data, a sub-core 16 of the same material as the main core 10 is included between the poles 11 and 12. The width of the sub-core 16 may be the thickness w illustrated in FIG. 1b. The sub-core 16 comprises an extension 17 of the flux return pole 12 to form a gap of length g with respect to the recording pole 11. The sub-core 16 further includes a member 18 affixed at one end to the extension member 17 and separated at the other end from the flux return pole 12 by a gap of dimension c. A coil w3 wound on the member 18 controls the sub-core 16 in accordance with whether the head is to operate in the WRITE or READ mode.

In the WRITE mode, current is applied to the coil w3 to saturate the sub-core 16. The saturation of the sub-core 16 reduces the permeability of the sub-core members 17 and 18 to that of air so that effectively the sub-core 16 is not magnetically present during writing. In the READ mode the coil w3 is not energized and the sub-core 16 resumes the high permeability state of the material utilized, thereby forming a ring-type inductive READ head with the main core 10 having an effective gap length of g. Thus in the READ mode the core 10 with the sub-core 16 becomes a ring-type READ head for recovering the recorded information in the conventional differentiated magnetic reading manner. The magnetized flux changes in the medium 14 are detected via the gap g and converted into electrical signals via the winding w1 for external data processing. In the READ mode the core 10' is not utilized and thus the winding w2 is de-energized.

The back gap c is utilized as a control parameter with respect to saturating the sub-core 16 via the coil w3. Adjustng the dimension of the back gap c provides control over the magnitude of the current through the coil w3 to effect saturation. The back gap c can be reduced to zero whereupon the end of the member 18 illustrated adjacent the flux return pole 12 will be affixed thereto. The geometry of the members 17 and 18 can be of shapes other than those illustrated to facilitate manufacturing and to improve electrical performance providing magnetic efficiency is not compromised.

Thus it will be appreciated that during the WRITE mode, coil w3 is energized to saturate the sub-core 16 and the data encoded WRITE currents are applied to the windings w1 and w2. During the READ mode the winding w3 is de-energized, thus transforming the main core 10 and sub-core 16 into a longitudinal magnetic READ head with READ winding w1. The core 10' is not active during the entire READ mode. It is, therefore, appreciated that since reading and writing are achieved by independently operative portions of the transducer, individual performance optimization is attainable.

Figure 2A:
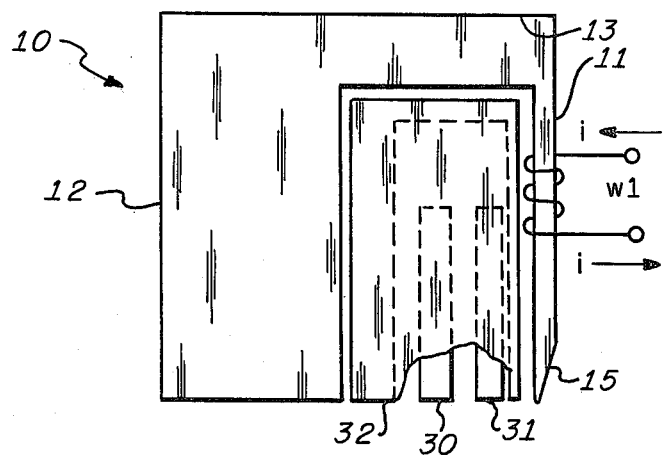
FIG. 2a is a front elevation view of an alternative embodiment of the invention.
Figure 2B:
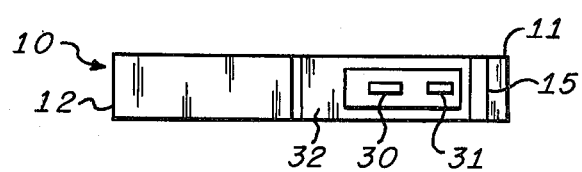

Referring now to FIGS. 2a and 2b, in which like reference numerals indicate like elements with respect to FIGS. 1a and 1b, a front elevation view and a bottom view, respectively, of an alternative reading arrangement for the present invention are illustrated. Instead of utilizing the sub-core 16 and winding w3 of FIG. 1a, for differentiated data recovery, magneto-resistive elements and magnetic shielding are incorporated between the poles 11 and 12 and utilized for direct flux sensing. Accordingly, magneto-respective elements 30 and 31 are supported within the space between the poles 11 and 12 by any convenient means and sense wires, not shown, connected to the magneto-resistive elements 30 and 31 provide the electrical signals representative of the recorded data directly proportional to the flux variations emanated from the magnetized medium 14. Magnetic shielding 32 surrounding the magneto-resistive elements 30 and 31 eliminates interference between the READ and WRITE modes of operation of the transducer. Since reading and writing are achieved by independent isolated structures, individual performance optimization is attainable. The magnetic shield 32 is supported within the core 10 by any suitable insulating material. The relative permeabilities of the materials of the shield 32, the core 10 and the magnetic medium 14 as well as the spacing between the shield 32 and the core 10 are selected to establish a relatively high reluctance path between the core 10 and the shield 32 as compared to a relatively low reluctance path between the recording pole 11 and the magnetic medium 14. Since flux does not penetrate the shield 32, the magneto-resistive elements 30 and 31 are magnetically isolated from the core. The shield 32 can be comprised of any suitable high permeability material.

Although the magneto resistive-elements 30 and 31 can sense flux directly, it may be desirable to operate the sensors in a differential mode to detect flux variations rather than absolute flux magnitudes so as to improve sensitivity in reading high density bit transitions. The two magneto-resistive elements 30 and 31 may also be utilized in the differential mode to ameliorate the temperature sensitivity problem associated with the elements.

Figure 3:
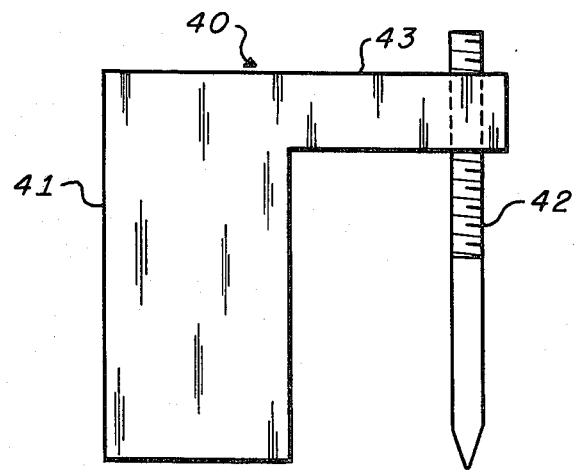
FIG. 3 is a front elevation view of a further alternative embodiment of the invention.

Referring now to FIG. 3, a further embodiment of the present invention is illustrated. In this embodiment a core 40 is comprised of a leading flux return pole 41, a trailing recording pole 42 and an intermediate magnetic connecting member 43 therebetween. The materials and general configuration of the embodiment of FIG. 3 are similar to that described above with respect to FIGS. 1a, 1b, 2a and 2b except that the magnetic connection between the recording pole 42 and the member 43 is vertically adjustable for fine control of head-medium separation permitting minimization of the spacing between the reading pole and the medium. This is a critical parameter for performance. This embodiment provides the advantage of relaxed manufacturing tolerances. The embodiment may be utilized for contact recording and in this arrangement the recording tip must be aerodynamically smooth to provide good contact recording wear characteristics.

The above described embodiments of the invention were explained in terms of a core on one side of the medium and a complementary flux return core on the other side of the medium with either the READ sub-core 16 of FIG. 1a or the magneto-resistive elements 30 and 31 of FIG. 2a included with the core adjacent one of the surfaces of the medium. Further embodiments of the present invention may be realized in systems where the magnetic medium is on a substrate of high permeability material. In such an arrangement the high permeability substrate may be utilized as the flux return path between the recording pole and the flux return pole of the upper core, thereby eliminating the lower core. Only the upper core portion of the complementary head would be utilized for recording and playback. Additionally, for two sided recording utilizing a high permeability substrate with a magnetic medium on each surface thereof, two single sided arrangements of this type may be utilized to perform the READ/WRITE functions with respect to each surface.

Figure 4:
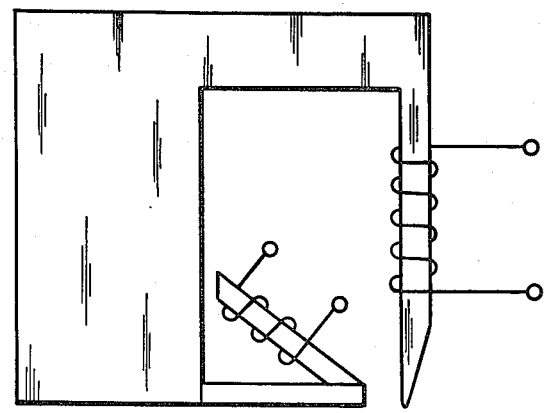
FIG. 4 is a front elevation view of a still further alternative embodiment of the invention.

FIG. 4 illustrates this embodiment of the invention in a single sided version thereof utilizing the subcore READ arrangement of FIG. 1a. It is appreciated that alternatively the magneto-resistive configuration of FIG. 2a may be utilized.

The above described embodiments of the invention were explained in terms of effecting the READ function by utilizing either the sub-core 16 of FIG. 1a or the magneto-resistive elements 30 and 31 of FIG. 2a. If the flying height $h_1$ (FIG. 1a) of the main core is substantially reduced and the distance from the medium of the complementary core is similarly reduced, the reluctance lossed due to the air gaps in the magnetic circuit enclosed by the two cores will be substantially diminished. With this diminution in reluctance loss, the basic structure of the two cores may be utilized to perform the READ function without utilizing additional structures such as the subcore 16 of FIG. 1a and the magneto-resistive elements 30 and 31 and the shield 32 of FIG. 2a. The flux lines from the magnetized medium 14 in such an arrangement can efficiently encircle cores 10 and 10' permitting the windings w1 and w2 to detect flux changes.

The above described embodiments of the invention were explained in terms of coils wound on the recording poles. Since the dimensions of the recording poles can be reduced to a small value to enhance performance, the coils may alternatively be wound on either the flux return poles 12 and 12' of FIGS. 1a and 2a or the flux return pole 41 of FIG. 3. The coils may also be wound on the intermediate members 13, 13' or 43. Such arrangements may suffer from slight degradation in magneto-motive force but provide an effective compromise with respect to manufacturability. In this regard it is desirable where practicable to locate the coils utilized for writing as close to the magnetic medium as possible and as perpendicular as possible to preserve the efficiency and to reduce field spreading.

The above described embodiments of the invention were explained in terms of the specifically shaped recording tips of the recording poles 11 (FIG. 1a) and 42 (FIG. 3) as well as in terms of the generally U-shaped cores illustrated. It is appreciated that other shapes and configurations of the cores and recording tips may be utilized in practicing the invention.

Figure 5C:
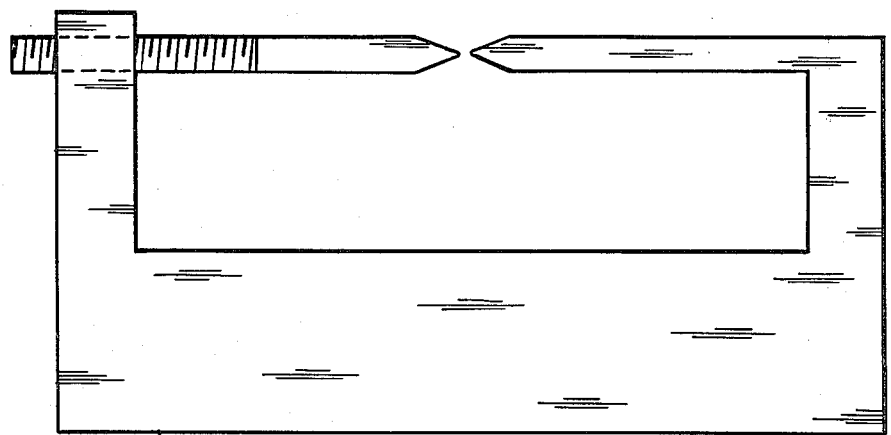
FIGS. 5a, 5b and 5c are front elevation views of yet still further alternative embodiments of the invention.
Figure 5B:
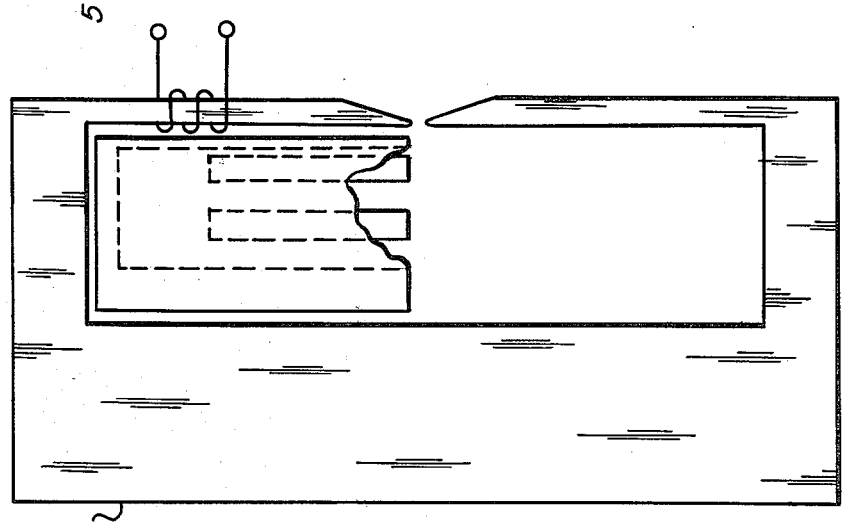
Figure 5A:
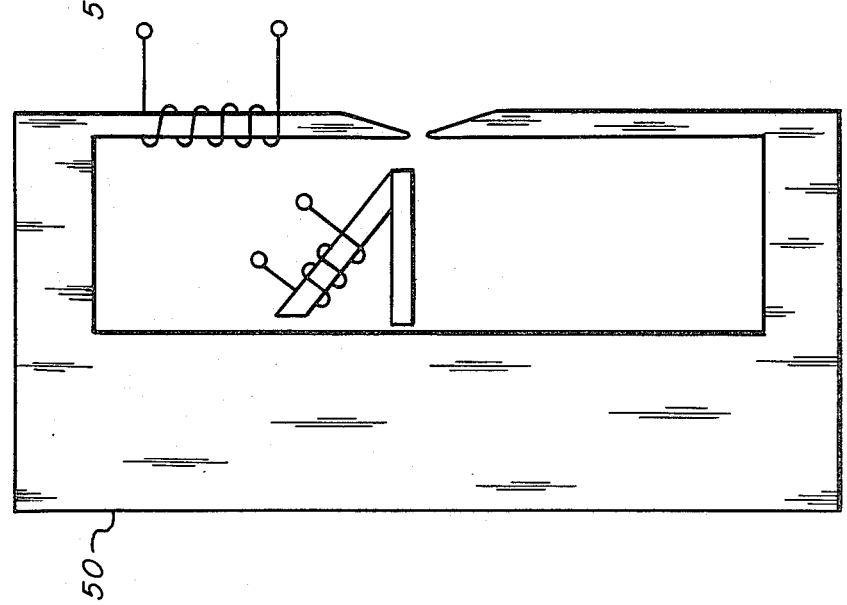

A further embodiment of the invention may be effected by connecting the flux return poles 12 and 12' of FIG. 1a to each other to form a generally C-shaped core. This embodiment may be utilized with or without the READ additive structures of FIGS. 1a and 2a. Such an embodiment may be utilized with magnetic tape and the like. FIGS. 5a, 5b and 5c illustrate three versions of this embodiment of the invention wherein FIG. 5a utilizes the READ sub-core of FIG. 1a, FIG. 5b utilizes the magneto-resistive elements of FIG. 2a, and FIG. 5c utilizes the adjustable recording pole of FIG. 3. The embodiments of FIGS. 5a, 5b and 5c are illustrated with flux return members 50 having cross sectional dimensions greater than those of the recording poles. Although this is the preferred arrangement, it will be appreciated that in these embodiments the requirement of a significantly greater flux return cross sectional area than those of the recording poles is relaxed. It is further appreciated that the windings may be disposed on any portion of the core.

The present invention can be utilized in any moving magnetic medium storage system such as tape, drum, discs, floppy diskettes and the like. The transducers can be fabricated using either the thin-film evaporation plating technique presently utilized to fabricate thin film heads, or the discrete ferrite or mu-metal core and winding process utilized to fabricate conventional longitudinal magnetic recording ring-type heads. Processes used in the semiconductor arts may also be utilized to fabricate the embodiments of the invention described above.

It will be appreciated from the foregoing that the transducer of the present invention provides a well confined orthogonal flux field to the surface of the recording medium with efficient magnetic return path critical to high-frequency operation. Thus, the present invention achieves the requirements for obtaining the high areal bit density advance in the art that perpendicular magnetic recording provides. Additionally, the efficient flux enclosure path permits the high flux switching rates necessary in a high density storage system.

The present invention provides the READ and WRITE functions in the same transducer. Unlike the compromise necessarily effected with longitudinal magnetic recording heads, each of the READ and WRITE functions can be independently optimized. The transducer of the present invention is practicable with respect to manufacturability and is compatible with existing magnetic storage head mounting mechanical assemblies.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A transducer for perpendicular magnetic recording on a magnetic medium comprising
    a core of magnetic material,
    a coil disposed on said core,
    said core comprising a recording member and a flux return member, said recording member and said flux return member, in use, being disposed adjacent said medium on one side thereof,
    said flux return member having a substantially greater cross sectional area than said recording member,
    further flux return means, in use, disposed adjacent said medium on the side thereof opposite said one side and spanning said recording and flux return members,
    said recording member, flux return member and further flux return means being so arranged with respect to each other that current flowing through said coil generates closed lines of flux threading said flux return member, said recording member and said further flux return means and traversing said medium perpendicular thereto from said recording member to said further flux return means and,
    means disposed between said recording member and said flux return member for reading data recorded on said medium.

2. The transducer of claim 1 in which said further flux return means comprises a further core having a further recording member and a further flux return member having cross sectional dimensions substantially identical to those of said recording member and said flux return member respectively, said further recording member and said further flux return member being aligned with said recording member and said flux return member respectively,
    said core and said further core being so arranged with respect to each other on opposite sides of said medium that current flowing through said coil generates closed lines of flux threading said core and said further core and traversing said medium perpendicularly thereto from said recording member to said further recording member.

3. The transducer of claim 1 in which said recording member includes a recording tip having a contour adjacent said medium for concentrating said lines of flux traversing said medium.

4. The transducer of claim 2 in which said recording member and said further recording member include a recording tip and a further recording tip, respectively, each having a contour adjacent said medium for concentrating said lines of flux traversing said medium.

5. The transducer of claim 1 in which said core includes an intermediate member of magnetic material magnetically connecting said recording member to said flux return member to form a generally U-shaped core.

6. The transducer of claim 2 in which said core and said further core include an intermediate member and a further intermediate member, respectively, of magnetic material magnetically connecting said recording member to said flux return member and said further recording member to said further flux return member, respectively, to form a generally U-shaped core and a generally U-shaped further core, respectively.

7. The transducer of claim 1 in which said recording member and said flux return member are so spaced apart from each other as to reduce leakage flux therebetween.

8. The transducer of claim 2 in which said recording member and said flux return member are so spaced apart from each other and said further recording member and said further flux return member are so spaced apart from each other as to reduce leakage flux therebetween, respectively.

9. The transducer of claim 1 in which said magnetic medium is disposed on a substrate of magnetic material having a permeability greater than that of said magnetic medium, said substrate comprising said further flux return means.

10. The transducer of claim 1 in which said reading means comprises
a sub-core of magnetic material extending from said flux return member toward said recording member forming a gap with said recording member for differentiated magnetic reading, and
a coil disposed on said sub-core,
current flowing through said coil disposed on said sub-core magnetically saturating said sub-core to reduce the permeability thereof, thereby rendering said sub-core magnetically ineffective during recording operations of said transducer, and with no current flowing through said coil disposed on said sub-core, said sub-core and said core forming a ring-type transducer for differentiated magnetic reading during reading operations of said transducer.

11. The transducer of claim 10 in which said sub-core comprises
an extension member affixed at one end to said flux return member and extending toward said recording member to form said gap therewith, and
a further sub-core member magnetically affixed to said extension member and extending toward said flux return member and magnetically affixed thereto.

12. The transducer of claim 10 in which said sub-core comprises
an extension member affixed to said flux return member and extending toward said recording member to form said gap therewith, and
a further sub-core member magnetically affixed to said extension member and extending toward said flux return member and forming a gap therewith,
the dimension of said gap between said further sub-core member and said flux return member providing control over the amount of current through said winding disposed on said sub-core required to saturate said sub-core.

13. The transducer of claim 1 in which said reading means comprises at least one magneto-resistive element for sensing flux recorded on said medium.

14. The transducer of claim 13 further including magnetic shield means disposed between said recording member and said flux return member and surrounding said magneto-resistive element for magnetically isolating said magneto-resistive element from said core.

15. The transducer of claim 1 further including an adjustable connection between said recording member and said core for adjusting the spacing between said recording member and said medium.

16. The transducer of claim 5 further including an adjustable connection between said intermediate member and said recording member for adjusting the spacing between said recording member and said medium.

17. The transducer of claim 2 in which said core and said further core are disposed in such proximity to said medium that flux recorded in said medium threads through said core and said further core and induces signals in said coil indicative of data recorded on said medium.

18. The transducer of claim 2 including a further coil deposed on said further core, said core and said further core being disposed in such proximity to said medium that flux recorded in said medium threads said core and said further core and induces signals in said further coil indicative of data recorded on said medium.

19. The transducer of claim 2 including a further coil disposed on said further core,
said core and said further core being so arranged with respect to each other on opposite sides of said medium that current flowing through said further coil generates closed lines of flux threading said core and said further core and traversing said medium perpendicularly thereto from said recording member to said further recording member.

20. The transducer of claim 19 wherein current flowing through said coil and said further coil creates opposite magnetic poles at the ends adjacent said medium of said recording member and said further recording member, respectively.

21. A transducer for perpendicular magnetic recording on a magnetic medium comprising
a core of magnetic material,
a coil disposed on said core,
said core comprising first and second recording members and a flux return member, said first and second recording members being aligned collinearly with respect to each other and, in use, being disposed adjacent said medium on opposite sides of said medium respectively,
said first and second recording members and said flux return member being so arranged with respect to each other that current flowing through said coil generates closed lines of flux threading said first and second recording members and said flux return member and traversing said medium perpendicularly thereto from said first recording member to said second recording member, and means disposed between one of said first and second recording members and said flux return member for reading data recorded on said medium.

22. The transducer of claim 21 in which said first and second recording members have substantially the same cross-sectional dimensions with respect to each other and said flux return member has a substantially greater cross sectional area than either said recording member.

23. The transducer of claim 21 in which said first and second recording members include first and second recording tips, respectively, at least one thereof having a contour adjacent said medium for concentrating said lines of flux traversing said medium.

24. The transducer of claim 21 in which said core includes first and second intermediate members of magnetic material magnetically connecting said flux return member to said first and second recording members, respectively, to form a generally C-shaped core.

25. The transducer of claim 21 in which said first and second recording members are spaced apart from said flux return member so as to reduce leakage flux therebetween.

26. The transducer of claim 21 in which said reading means comprises a sub-core of magnetic material extending from said flux return member toward said one of said recording members forming a gap therewith for differentiated magnetic reading, and a coil disposed on said sub-core, current flowing through said coil disposed on said sub-core magnetically saturating said sub-core to reduce the permeability thereof, thereby rendering said sub-core magnetically ineffective during recording operations of said transducer, and with no current flowing through said coil disposed on said sub-core, said sub-core and said core forming a ring-type transducer for differentiated magnetic reading during reading operations of said transducer.

27. The transducer of claim 26 in which said sub-core comprises an extension member affixed at one end of said flux return member and extending toward said one recording member to form said gap therewith, and a further sub-core member magnetically affixed to said extension member and extending toward said flux return member and magnetically affixed thereto.

28. The transducer of claim 26 in which said sub-core comprises an extension member affixed to said flux return member and extending toward said one recording member to form said gap therewith, and a further sub-core member magnetically affixed to said extension member and extending toward said flux return member and forming a gap therewith, the dimension of said gap between said further sub-core member and said flux return member providing control over the amount of current through said winding disposed on said sub-core required to saturate said sub-core.

29. The transducer of claim 21 in which said reading means comprises at least one magneto-resistive element for sensing flux recorded on said medium.

30. The transducer of claim 29 further including magnetic shield means disposed between said one recording member and said flux return member and surrounding said magnetoresistive element for magnetically isolating said magnetoresistive element from said core.

31. The transducer of claim 21 further including an adjustable connection between at least one of said recording members and said core for adjusting the spacing between said one recording member and said medium.

32. The transducer of claim 24 further including an adjustable connection between at least one of said recording members and the intermediate member associated therewith for adjusting the spacing between said one recording member and said medium.

33. The transducer of claim 21 in which said first and second recording members are disposed in such proximity to said medium that flux recorded in said medium threads said core and induces signals in said coil indicative of data recorded on said medium.

* * * * *